Nov. 26, 1968 MASAYOSHI SHIOTA 3,412,506
SECURING MEANS FOR SUNSHADE SCREENS FOR AUTOMOBILES OR THE LIKE
Filed May 19, 1967 2 Sheets-Sheet 1

Masayoshi Shiota, INVENTOR

BY Wenderoth, Lind & Ponack, Attorneys

Nov. 26, 1968  MASAYOSHI SHIOTA  3,412,506
SECURING MEANS FOR SUNSHADE SCREENS FOR AUTOMOBILES OR THE LIKE
Filed May 19, 1967  2 Sheets-Sheet 2
FIG. 3
FIG. 4
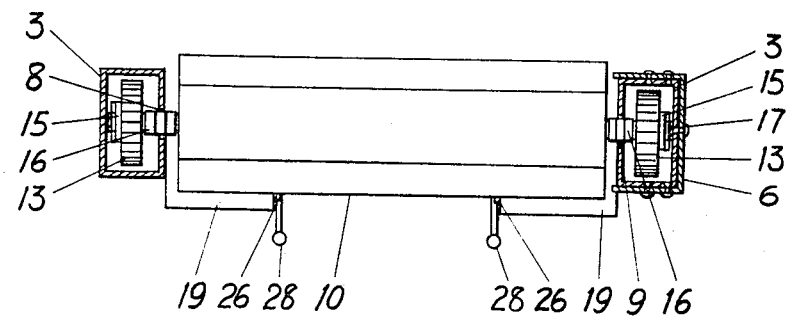
FIG. 5
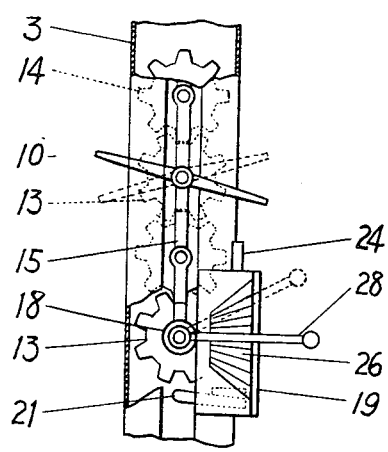
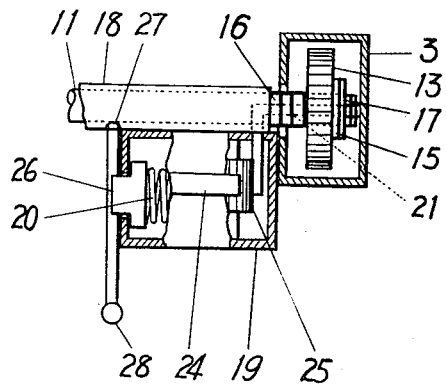
Masayoshi Shiota,
INVENTOR
BY Wenderoth,
Lind & Ponack, Attorneys

United States Patent Office 3,412,506
Patented Nov. 26, 1968

3,412,506
SECURING MEANS FOR SUNSHADE SCREENS FOR AUTOMOBILES OR THE LIKE
Masayoshi Shiota, Otsu 479, Oaza Takotsu, Tadotsu-machi, Naka Tado-gun, Kagawa-ken, Japan
Filed May 19, 1967, Ser. No. 639,876
4 Claims. (Cl. 49—82)

ABSTRACT OF THE DISCLOSURE

A slatted sunshade for mounting in an automobile and the like, comprising a pair of spaced parallel guide rails each having a hollow interior and guide slots in the opposed faces of the spaced rails opening into the respective hollow interiors, a plurality of rods extending between the guide rails with the ends of the rods extending through the guide slots into the interiors of the guide rails, a slat mounted on each rod, a gear wheel on each end of each rod and positioned in a guide rod, an idler gear between each pair of gear wheels and in mesh with said gear wheels within said guide rails, connecting means connecting the chain of gear wheels and idler gears in each guide rail, and a control means coupled to the lowest of said rods for rotating said rod, whereby the gear trains are rotated to adjust the angle inclination of said slats.

---

The present invention relates to securing means for securing a slatted sunshade to windows of automobiles or the like.

All slatted sunshades for automobiles hitherto known have had a construction adapted to fit parallel windows, and when fitted to a window which was not parallel longitudinally, a considerable space was left between the window and the sunshade slats thus wasting space, or disturbing the passengers or interfering with the driving, resulting in extreme difficulties in fitting this type of sunshades to automobiles.

The present invention seeks to overcome this problem, and the principal object of the invention is to provide a slatted sunshade for mounting on non-parallel window frames (or sash) in a simple manner.

Another object of the present invention is to provide sunshade slats and guide rails which can be stored easily.

Another object of the present invention is to provide sunshade slats which can be arranged at any suitable height.

A further object of the present invention is to provide a securing means for sunshade slats wherein the inclination of the sunshade slats can be easily varied.

Referring to those objects, the sunshade of the present invention has two parallel guide rails having guide slots therein, through which project the ends of rods each having a sunshade slat mounted therein. Each rod is pivoted on a gear wheel at each end, and an idle gear is positioned between every two said gear wheels and in mesh therewith, and said gears are connected in series by links. The lowest rod is connected with operational levers and the inclination of said sunshade slats can be varied suitably by operating said operational levers. When no sunshade slats are required, the slats are in guide positions on the inside ceiling of the car, and a movable guide rail is hinged so as to be capable of being swung up and hooked to the upper transverse frame of the car window by a suitable hook, thereby avoiding disturbance of passengers or the driver, and, in addition, making it easy to use the car door.

The sunshade according to the present invention will now be described in detail in particular reference to the accompanying drawings, in which FIG. 1 is a general view of the sunshade according to the present invention mounted on an automobile window;

FIG. 3 is a sectional view taken on line III—III of FIG. 2;

FIG. 4 is a plan view, partly in section, at one end of the lowest member of the sunshade; and FIG. 5 is a longitudinal sectional view of line V—V of FIG. 2 showing the means to vary the inclination of the sunshade slats by means of the operation of an operating lever.

Figure 1:
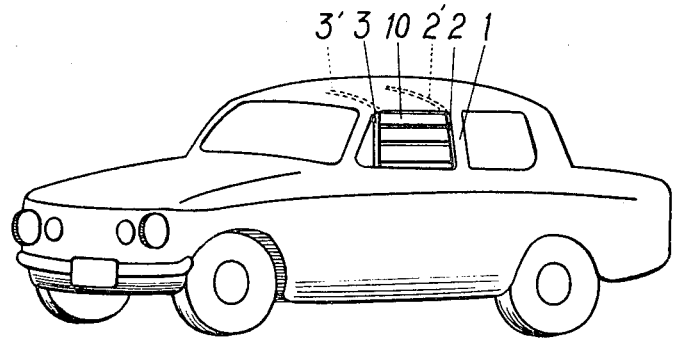
Figure 2:
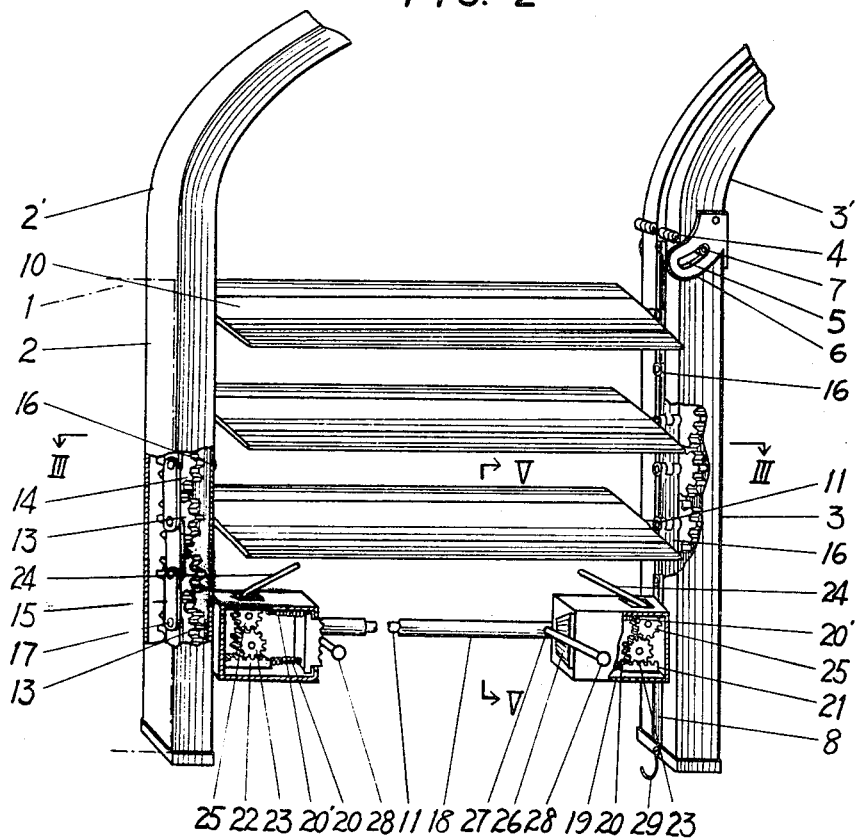
FIG. 2 is a perspective view, partly broken away, of the sunshade.

Referring to the figures of the accompanying drawings, there are provided two parallel vertical guide rails 2 and 3 of identical shape on a window frame 1. The upper portion of guide rails 2 and 3 both have extended guide rail portions 2' and 3' bent along the ceiling of the interior of the car. However, guide rail portion 3' is connected to the guide rail 3 by a hinge 4. Furthermore, on the lower end of the guide rail portion 3', are two metal pieces 6 each having an arcuate slot 5 therein and between each is the upper end of the guide rail 3, and a sliding pin 7 in the upper end of guide rail 3 is slidably engaged in said arcuate groove 5, the guide rail 3 being pivotable toward guide rail 2.

Each of the guide rails is approximately rectangular in cross section. Guide slots 8 and 9 are provided on the opposed inner faces thereof. Rods 11 extend between the guide rails and have the ends extending into the slots, each of said rods 11 having secured to the central portion thereof a sunshade slat 10. Both ends of each rod 11 are pivoted on gear wheels 13. In order to provide a plurality of said pivoted gear wheels which will rotate in the same direction, an idle wheel 14 is provided between every two pivoted gear wheels and is in mesh therewith, and the whole train of gear wheels in each guide rail held together by links 15 on the outside and links on the inside and fixed to the gear wheels by bolts 17. The lowest rod 11 has a guide tube 18 therearound instead of a sunshade slat 10.

A control box 19 is provided near each end of guide tube 3 at the bottom of each guide rail in order to control the vertical position of sunshade slats 10. In each control box is a stop 21 pressed toward the guide rails by a spring 20. Said stop 21 has one end extending into slots 8 and 9 of the guide rails so as to come into contact with the inner wall surface of guide rail. By such an engagement sunshade slats 10 can be set at any suitable height along the guide rails. The other end of stop 21 has a rack 22, thereon with teeth thereon in mesh with a gear 23 which in turn meshes with gear 25 which has a handle 24 attached thereto by which gear 25 can be rotated. Furthermore, springs 20 and 20' press a holder 26 outwardly through the side of the box, and said holder 26 engages an operating lever 28 secured to the lowermost rod 11 through hole 27 in the guide tube 18. In addition, a hook 29 is provided at the lower end of guide rail 3.

In the use and operation of the sunshade of the present invention having above-described the construction, guide rail 2 with portion 2' is secured to an opproximately perpendicular car window 1 by appropriate means and guide portion 3' is fixed to the car ceiling by similar means and parallel to portion 2'. The guide rail 3 is pivoted from guide rail portion 3' by hinge 4 and metal pieces 6, and the sunshade slats 10 are raised so that they are between portions 2' and 3' when the sunshade is not needed and the guide rail being folded upwardly around the hinge 4 and hook 29 being hooked to the window frame or to guide rail 2. The car door can then open freely. On the contrary, when the sunshade slats 10 are needed, the guide rail 3 is first swung down to the vertical position and handles 24 are pressed downward by hand. Then the sunshade slats can be lowered along the guide rails in a simple manner. Normally, the stop 21 moves outward under the pressure of spring 20 and comes in contact with the inner wall surfaces of guide rails 2 and 3 to hold the slats in position. When handle 24 is pushed down, the stop 21 is moved against spring 20 by gears 25 and 23 rotated by the handle, releasing the contact with the guide rail, thereby enabling free vertical movement.

Since gear wheel groups 13 and 14 in mesh within guide rails 2 and 3 are held between links 5 and 6 and connected in series, the sunshade slats 10 are lowered consecutively to the desired height when guide tube 18 is pushed down. During the vertical operation of sunshade slats 10, since both ends of the sunshade slats 10 are pivoted to gear wheels 13 which are also held between links 15 and 16 on both sides, the sunshade slats can be raised and lowered very smoothly, without causing torsion of the sunshade slats themselves and further without the ends of the sunshade slats entering the slots 8 and 9 in the guide rails. On the other hand, the inclination of the sunshade slats can be adjusted by rotating the gear wheel group by actuating the operating lever 28. In this case, each gear wheel 13 rotates in the same direction, because an idle gear 14 is provided between every two pivoted gear wheels. Said rotation is transmitted to the group of sunshade slats through rods 11, all of which will rotate through a similar angle in the same direction. When the desired angle of the sunshade slats 10 is reached after moving operating lever 28, the angular position can be set by holder 26 under the action of spring 20, thereby preventing the direct passage of sunshine and introducing cool air inside the car, even when the hands are removed.

What is claimed is:

1. A slatted sunshade for mounting in an automobile and the like, comprising a pair of spaced parallel guide rails each having a hollow interior and guide slots in the opposed faces of the spaced rails opening into the respective hollow interiors, a plurality of rods extending between the guide rails with the ends of the rods extending through the guide slots into the interiors of the guide rails, a slat mounted on each rod, a gear wheel on each end of each rod and positioned in a guide rod, an idler gear between each pair of gear wheels and in mesh with said gear wheels within said guide rails, connecting means connecting the chain of gear wheels and idler gears in each rail, and a control means coupled to the lowest of said rods for rotating said rod, whereby the gear trains are rotated to adjust the angle inclination of said slats.

2. A sunshade as claimed in claim 1 in which said guide rails each have a guide rail portion at the top end thereof, the part of one of said guide rails below the guide rail portion thereof being hinged to the guide rail portion for pivotal movement toward the other guide rail.

3. A sunshade as claimed in claim 1 further comprising means for fixing the position of the slats coupled to the lowest of said rods, and comprising a stop projecting through the guide slots of at least one of the guide rails adjacent the lowest rod and engageable with the guide rail to fix the position of the rod, a rack on the end of the stop outside the guide rail, gear means engaged with the rack, and a handle coupled to said gear means for rotating the gear means so as to move the rack.

4. A sunshade as claimed in claim 3 in which said means is contained in a control box, said control means also being at least partly in said box, and comprising spring means bearing on said stop, a holding member projecting through the wall of the control box and having the spring means bearing thereon for urging the holding member out of the box, a lever on said lowest rod engaged by said holding member for holding the lever with the rod fixed in a rotational position.

References Cited
UNITED STATES PATENTS

| | | | |
|---|---|---|---|
| 83,286 | 10/1868 | Johnston | 49—84 |
| 1,583,597 | 5/1926 | Lafferty | 49—88 |
| 2,742,680 | 4/1956 | Cappetta | 49—88 |
| 2,861,836 | 11/1958 | Goeggel | 160—201 X |
| 3,083,630 | 4/1963 | Thaxton | 160—105 X |

DAVID J. WILLIAMOWSKY, *Primary Examiner.*

P. C. KENNAN, *Assistant Examiner.*